United States Patent [19]

Koppang

[11] Patent Number: 5,993,203
[45] Date of Patent: Nov. 30, 1999

[54] HEAT TRANSFER ENHANCEMENTS FOR INCREASING FUEL EFFICIENCY IN HIGH TEMPERATURE FURNACES

[75] Inventor: Richard Koppang, Dana Point, Calif.

[73] Assignee: Gas Research Institute, Chicago, Ill.

[21] Appl. No.: 08/944,706

[22] Filed: Oct. 6, 1997

Related U.S. Application Data

[63] Continuation of application No. 08/551,580, Nov. 1, 1995.
[51] Int. Cl.$^6$ ................................. F27D 17/00
[52] U.S. Cl. ..................... 432/180; 432/179; 432/181
[58] Field of Search ................... 432/179, 180, 432/181; 65/134.6, 335

[56] References Cited

U.S. PATENT DOCUMENTS

| | | |
|---|---|---|
| 3,885,919 | 5/1975 | Pillard . |
| 4,144,017 | 3/1979 | Barsin et al. . |
| 4,328,020 | 5/1982 | Hughes ................................. 432/181 |
| 4,347,072 | 8/1982 | Nagoaka et al. . |
| 4,372,770 | 2/1983 | Krumwiede et al. ................. 65/134.6 |
| 4,375,235 | 3/1983 | Tsai ...................................... 432/181 |
| 4,506,726 | 3/1985 | Tsai ...................................... 432/181 |
| 4,599,100 | 7/1986 | Demarest, Jr. ....................... 65/134.6 |
| 4,761,132 | 8/1988 | Khinkis .................................. 431/10 |
| 5,052,919 | 10/1991 | Becker .................................. 431/10 |
| 5,052,921 | 10/1991 | Hemsath .............................. 432/121 |
| 5,057,010 | 10/1991 | Tsai ...................................... 432/179 |
| 5,062,789 | 11/1991 | Gitman ................................... 431/9 |
| 5,139,755 | 8/1992 | Seeker et al. ........................ 423/235 |
| 5,203,859 | 4/1993 | Khinkis et al. ....................... 432/180 |
| 5,215,455 | 6/1993 | Dykema .................................. 431/3 |
| 5,238,396 | 8/1993 | Yap ........................................ 431/10 |
| 5,242,295 | 9/1993 | Ho ......................................... 431/10 |
| 5,308,239 | 5/1994 | Bazarian et al. ..................... 431/10 |
| 5,387,100 | 2/1995 | Kobayashi ............................. 431/10 |
| 5,795,364 | 8/1998 | Payne et al. ......................... 65/134.6 |

FOREIGN PATENT DOCUMENTS 0 599 547 A1  6/1994  United Kingdom ............ C03B 5/235
0 599 548 A1  6/1994  United Kingdom ............ C03B 5/235

OTHER PUBLICATIONS

J. R. Rigby and B. W. Webb, Mechanical Engrg. Dept., and T. H. Fletcher, Chemical Engrg. Dept., "Measurement of the Optical Properties of Coal–Derived and Propane–Derived Soot in a Flat Flame Reactor," Brigham Young University.

P. A. Eibeck, J. O. Keller, T. T. Bramlette, and D. J. Sailor, "Pulse Combustion: Impinging Jet Heat Transfer Enhancement," *Combustion Sci. and Tech.*, vol. 94, pp. 147–165, 1993.

P. Bony, "Flue Gas Heat Recovery in Glass Furnaces," *Glass*, Nov. 1983.

W. J. Horan, A. G. Slavejkov, and L. L. Chang, "Heat Transfer Optimization in TV Glass Furnaces," 56th Conference on Glass Problems, Conference Proceedings, pp. 141–151.

A. Zanoli, E. R. Begley, R. Vidil, and D. Lagarenne, "Thermal Performance of Cruciform Regenerator Packings," *Glass*, Mar. 1990.

(List continued on next page.)

*Primary Examiner*—Philip H. Leung
*Assistant Examiner*—Jiping Lu
*Attorney, Agent, or Firm*—Pauley Peterson Kinne & Fejer

[57] ABSTRACT

Techniques for increasing the thermal efficiency of high temperature combustion sources such as glass and other process furnaces are disclosed. These techniques include one or more of the steps of co-firing of a carbonaceous solid fuel or heavy fuel oil with the primary fuel in the primary combustion zone such that the co-fired fuel is cracked and thereby generates a high number density of carbonaceous particles sufficient to improve soot radiation; providing enhanced mixing of first burnout air with the flue gas in a first burnout zone; and promoting instability of boundary layer gases adjacent refractory packings.

10 Claims, 4 Drawing Sheets

OTHER PUBLICATIONS

J. Delrieux, "The influence of the thermal properties of refractories and their mode of utilisation on the heat balance in regenerators*," *Glass Technology*, vol. 21, No. 4, Aug. 4, 1980. *Published in Revue générale de thermique, No. 149, May 1974.

J. B. Moss, C. D. Stewart, and K. J. Young, "Modeling Soot Formation and Burnout in a High Temperature Laminar Diffusion Flame Burning under Oxygen–Enriched Conditions," *Combustion and Flame 101*, 491–500 (1995).

An Exploratory Burner For Enhanced Flame Radiation, Final Report (Jun. 1988–Dec. 1990), GRI 5088–260–1748 (GRI 90/0287).

Enhanced Heat Transfer In Ribbed Ducts Using Vortex Generators, Annual Report (Jul. 1991–Jun. 1992), GRI–92/0333.

Mass Transfer In Oscillating Flows—Efficient Drying Via Pulse Combustors, Final Report (Jan. 1988–Sep. 1991), GRI–92/0136.

Literature Review Of Heat Transfer Enhancement Technology For Heat Exchangers In Gas–Fired Applications, Topical Technical Report (Apr. 1, 1991–Feb. 28, 1991), GRI 91–0146.

Irvin Glassman: *Combustion Second Edition*, Academic Press, Inc. Harcourt Brace Jovanovich Publishers, pp. 360–371.

Topical Report: Glass Tank $NO_x$ Emission Control With Gas Reburn, Prepared by Energy and Environmental Research Corporation, Industrial Processes Group,, Mar. 1994.

HEAT TRANSFER ENHANCEMENTS FOR INCREASING FUEL EFFICIENCY IN HIGH TEMPERATURE FURNACES

CROSS-REFERENCE TO RELATED APPLICATIONS

This is a continuation of application Ser. No. 08/551,580, which was filed on Nov. 1, 1995.

BACKGROUND OF THE INVENTION

1. Field of the Invention

The present invention is directed to apparatus and methods for increasing the thermal efficiency of high temperature combustion sources such as glass and other process furnaces. More particularly, although not exclusively, the present invention is directed to methods and apparatus for enhancing fuel efficiencies of regenerative furnaces and as well as for reducing the fuel penalty that is associated with the use of gas reburning for $NO_X$ control with respect to the same.

2. Technology Review

The combustion of fossil fuels, especially coals and heavy oils, produces a significant amount of $NO_X$ which ultimately participates in the formation of smog and acid rain. This problem is exacerbated in the case of certain combustion sources such as glass furnaces, cement and ceramic kilns, and steel reheat furnaces which operate at extremely high temperatures. Such high temperature combustion sources produce even greater levels of $NO_X$.

Currently, increasingly stringent air quality regulations impose requirements on glass manufacturing and other industries to reduce such $NO_X$ emissions. A number of technologies to reduce $NO_X$ emissions have been developed in response to such air quality regulations. A brief discussion of these technologies may be helpful to an understanding of the nature of the present invention.

Two technologies that have achieved generally moderate $NO_X$ reductions of approximately 40% to 50% at relatively low cost are low $NO_X$ burners and oxygen enriched air staging. These technologies offer good cost effectiveness (e.g., $400/ton of abated $NO_X$), but don't always meet stringent air quality regulations. These technologies also exhibit a small fuel penalty, typically on the order of 2% to 5%.

Two other technologies, that are capable of achieving 85% to 90% reductions in $NO_X$, are selective catalytic reduction and oxy-fuels. These technologies, however, suffer from high capital costs and high operating costs, respectively. Oxy-fuels exhibit poor cost effectiveness (typically $2500 per ton of abated $NO_X$). Further, selective catalytic reduction is poorly suited to glass furnaces because the alkalis, that are present in the exhaust gas, can rapidly poison the catalyst.

Two other $NO_X$ reduction technologies, that have been effective in achieving up to 60% $NO_X$ reductions, are combustion modification techniques such as staged combustion and reburning. Gas reburning can be applied to high temperature combustion sources such as glass furnaces and can achieve $NO_X$ reduction levels similar to oxy-fuel, but with a cost effectiveness similar to low $NO_X$ burners and oxygen enriched air staging.

Reburning is a controlled process that uses fuel to reduce oxides of nitrogen that are collectively referred to as $NO_X$. These oxides include NO (nitric oxide), $NO_2$ (nitrogen dioxide), and $N_2O_4$ (dinitrogen tetroxide), and $N_2O$ (nitrous oxide). In the reburning process, a fraction of the total fuel, typically an amount of fuel yielding between 10% to 20% of the total heat input, is injected above the main heat release zone to produce an oxygen deficient reburning zone. The combustion of reburning fuel forms hydrocarbon radicals which react with nitric oxide to form molecular nitrogen, thus reducing $NO_X$. This process occurs best in the at very low oxygen. Subsequently, burnout air is injected downstream of the reburn zone to combust the remaining fuel fragments and convert the exiting HCN and $NH_3$ species to either NO or $NO_2$.

Previous studies have shown that 60% to 80% reduction in $NO_X$ emissions can be achieved with natural gas reburning and that most of the reduction occurs in the reburning zone. $NO_X$ reduction in the burnout zone, via the HCN and $NH_3$ species from the reburning zone, is minimal because of the high burnout temperature (2200°–2400° F.) and the presence of an excessive amount of carbon monoxide ("CO", above 2% at 0.9 stoichiometry).

The overall reburning process can be divided conceptually into three zones as follows:

Primary Zone: The primary or main heat release zone normally accounts for approximately 80 percent of the total heat input to the system and is operated under fuel lean conditions. The level of $NO_X$ exiting this zone is defined to be the input to 7 the reburning process. If sufficient residence time is not provided, unburned fuel fragments may leave this zone and enter the reburning zone.

Reburning Zone: The reburning fuel is injected downstream of the primary zone to create a fuel rich, $NO_X$ reduction zone. Reactive nitrogen enters this zone from two sources: the primary $NO_X$ created in the main heat release zone and the fuel nitrogen, if any, in the reburn fuel. These reactive nitrogen species react with the hydrocarbon fragments formed during the partial oxidation of the reburning fuel, primarily CH species, to produce intermediate species such as HCN and $NH_3$. Additionally, some nitrogen is converted to $N_2$ and some is retained as NO. If the reburning fuel is a solid such as coal, nitrogen may also leave this zone as char nitrogen.

Burnout Zone: In this final zone, air is added to produce overall lean conditions and to oxidize all of the remaining fuel fragments. The total fixed nitrogen species (TFN=$NH_3$+HCN+NO+char nitrogen) will be either oxidized to $NO_X$ or reduced to molecular nitrogen.

It will be understood, however, that the introduction of gas reburn fuel downstream of the primary combustion zone represents a potentially significant increase in operating costs over other available $NO_X$ reduction technology.

Another, more advanced technique for $NO_X$ reduction, which is capable of obtaining $NO_X$ reduction of up to 90%, is "advanced gas reburn." Advanced gas reburn technology represents a synergistic combination of gas reburn technology with selective non-catalytic reduction. The techniques for advanced gas reburn are set forth in U.S. Pat. No. 5,139,755 (hereinafter the "'755 patent") which is incorporated by reference herein. Advanced gas reburn provides a significant incremental improvement in $NO_X$ control over conventional gas reburn and other combustion modification techniques, with only a minimal fuel efficiency penalty (approximately $600 per ton of abated $NO_X$) (which is similar to most other $NO_X$ reduction methods using combustion modification techniques).

The advanced gas reburn process has wide application to high temperature pyroprocessing and melting operations which employ direct fired combustion and furnace equipment. Such equipment is typically used in the manufacture of glass, refractory and steel products, and high temperature hydrocarbon (cracking) processes. Best results are typically obtained where post-combustion temperatures are in the range of 2200° to 2900° F.

In the case of glass furnaces, recovery regenerators or recuperators are commonly used to minimize thermal energy loss. Most large glass furnaces have staged regenerators where cavities exist. In the case of retro-fit advanced gas reburn, reburn fuel and burnout air are provided in a first cavity that is connected to the melting tank. A second or additional cavity, having a preferred temperature window of between 1650° and 1900° F., is provided downstream of the first cavity. The selective non-catalytic reducing agent, and burnout air, are introduced in the second cavity.

It will be understood, however, that the use of advanced gas reburn will nonetheless exhibit a potentially significant fuel penalty that is associated with the introduction of reburn fuel. While regenerators may be able to recapture 50% of this thermal energy loss, the remaining energy is lost. It will be therefore be understood that what is needed in the art are methods for optimizing reburning processes to thereby reduce the aforesaid fuel penalty to a minimum and to maintain the second cavity temperature in the preferred range.

It will also be understood that high temperature process furnaces and the like operate with substantial thermal inefficiencies. It will therefore be understood that it is desirable to minimize thermal inefficiencies that are associated with high temperature combustion sources. This would serve to further minimize the overall operating costs and hence reduce the aforesaid fuel penalty that is associated with reburning processes.

Such apparatus and methods are disclosed and claimed herein and comprise a number of control processes that may be used for optimization of gas reburn technology.

SUMMARY OF THE INVENTION

One embodiment of the present invention, is directed to a process for increasing industrial furnaces and the like having a primary combustion zone and one or more burnout air zones. The embodiment comprises one or more of the following:

(a) co-firing a heavy fuel oil or solid carbonaceous fuel with the primary fuel in the primary combustion zone such that the co-fired fuel is cracked and thereby generates a high number density of carbonaceous particles sufficient to improve soot radiation;

(b) introducing the reburn fuel into the reburn zone at or near sonic speeds;

(c) enhancing the mixing of first burnout air with the flue gas in a first burnout zone; and (d) promoting instability of boundary layer gases adjacent to the refractory packing.

In accordance with this embodiment, the mixing of the first burnout air with the flue gas can be carried out by using one or more high pressure burnout air nozzles, Helmholz resonators, acoustic wave generators, vortex generators, and other gas mixing devices.

Also in accordance with this embodiment, the instability of boundary layer gases adjacent the refractory packing can be promoted by using a refractory packing having a surface adapted to promote tripping of boundary layer gases. A Helmholz resonator, acoustic generator, vortex generator, or other suitable mechanism may be used in conjunction with the refractory surface to further promote tripping of the boundary layer gases.

Another embodiment of present invention is directed to a process for increasing thermal efficiencies for high temperature industrial furnaces and the like comprising the steps of:

(a) mixing a reburning fuel with combustion emissions in a gaseous reburning zone such that the reburning zone is substantially oxygen deficient;

(b) passing the resulting mixture of reburning fuel and combustion emissions into a first burnout zone;

(c) introducing burnout air into the first burnout zone such that the carbon monoxide concentration in the first burnout zone is reduced to a level below about 500 ppm;

(d) enhancing the mixing of first burnout air with the flue gas in a first burnout zone;

(e) advancing the resulting mixture from the first burnout zone to a second burnout zone having a temperature in the range from about 1300° F. to about 1900° F.; and (f) introducing a second stream of burnout air into the second burnout zone, said second stream of burnout air including a reducing agent capable of providing a source of nitrogenous reducing species thereby reducing the nitrogen oxides in the combustion emissions.

Another embodiment of the process of the present invention is directed to a process for increasing thermal efficiencies for high temperature industrial furnaces having a refractory packing comprising the steps of:

(a) mixing a reburning fuel with combustion emissions in a gaseous reburning zone such that the reburning zone is substantially oxygen deficient;

(b) passing the resulting mixture of reburning fuel and combustion emissions into a first burnout zone;

(c) introducing burnout air into the first burnout zone such that the carbon monoxide concentration in the first burnout zone is reduced to a level below about 500 ppm;

(d) advancing the resulting mixture from the first burnout zone to a second burnout zone having a temperature in the range from about 1300° F. to about 1900° F.;

(e) introducing into the second burnout zone a reducing agent capable of providing a source of nitrogenous reducing species thereby reducing the nitrogen oxides in the combustion emissions; and (f) advancing the second stream of burnout air and the combustion emissions to a bed of refractory packing, the bed of refractory packing having a surface adapted to promote the tripping of the boundary layer gases proximal to it.

It is an object of the present invention to provide apparatus and methods for enhancing heat transfer and thereby increasing fuel efficiencies in high temperature furnaces. With respect to furnaces of the regenerative type, the present invention may be used to provide enhanced fuel efficiencies as well as to reduce the fuel penalty that is associated with the use of gas reburning for $NO_X$ control.

Other objects and advantages of the invention will become apparent upon reading the following detailed description and appended claims, and upon reference to the accompanying drawings.

DETAILED DESCRIPTION

1. Structure and Operation of a Typical Glass Melting Furnace

The invention will be described here in relation to a typical glass processing furnace, as it has particular applicability to commonly employed regenerator structures. It will be understood, however, that the present invention may be applied to many types of combustion sources, including cement and ceramic kilns and steel reheat furnaces, which operate at extremely high temperatures.

Figure 1:
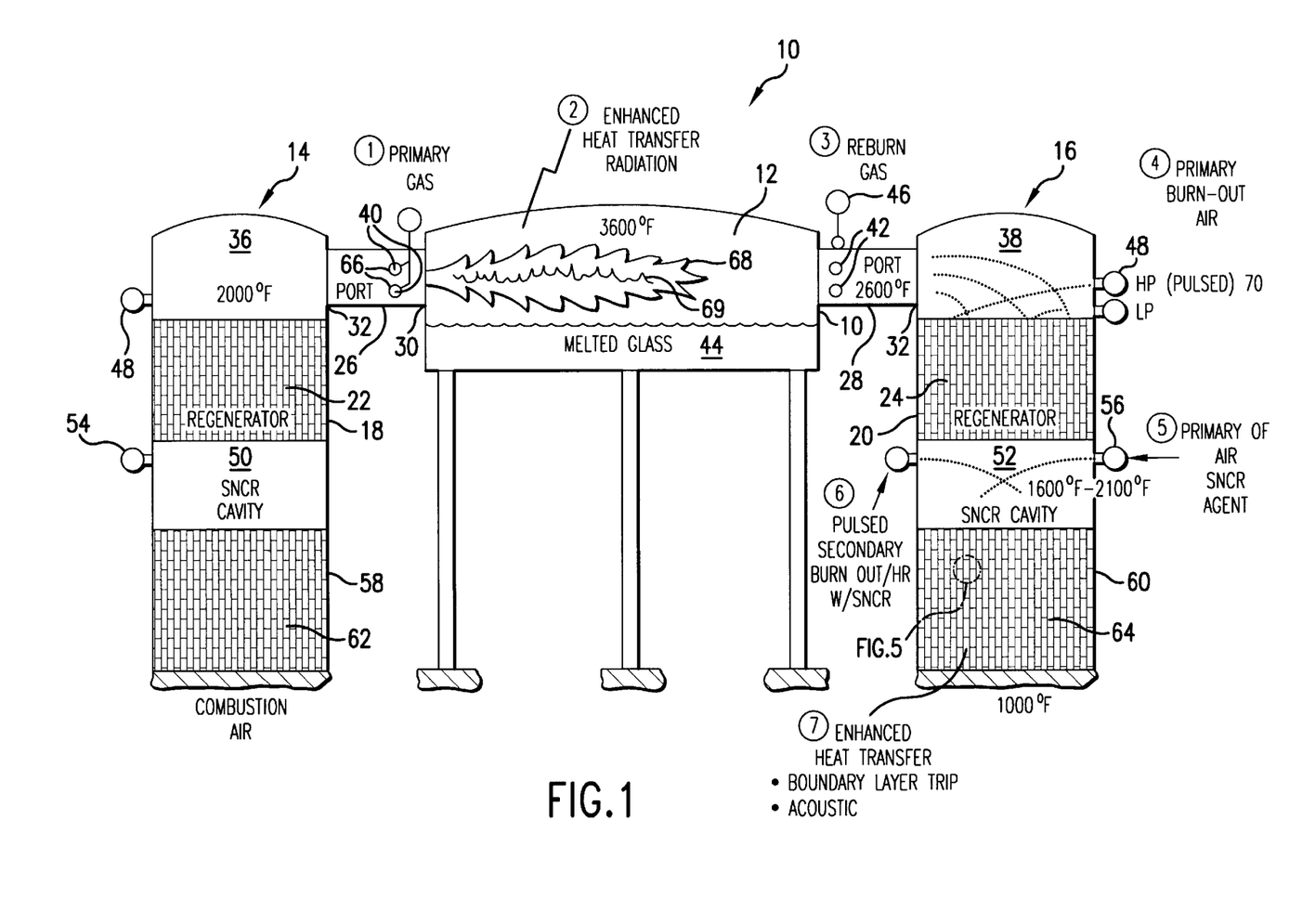
FIG. 1 is a diagramatic cutaway view of a glass processing furnace showing use of an embodiment of the present invention.

FIG. 1 is a diagrammatic cutaway view of a glass melting furnace 10 having a melting chamber 12 into which raw materials for making glass are fed. The furnace is of the cross-fired, regenerative type in which the melting chamber 12 is flanked by a pair of regenerators designated 14 and 16, respectively. The regenerators 14 and 16 include first refractory housings, 18 and 20, respectively, which contain beds of regenerator packing, 22 and 24, respectively. The beds of regenerator packing 22 and 24 comprise a checker of refractory brick that permits the alternate passage of air and exhaust gas through it.

Each of the regenerators 14 and 16 communicates with the melting chamber 12 by means of a plurality of ports, collectively represented by the ports 26 and 28 in FIG. 1, that are positioned along the sides of the melting chamber 12. Each of the ports 26 and 28 has an first open end 30 in communication with the interior of the melting chamber 12. A second open end 32 of each of the ports 26 and 28 is associated with one of a pair of first cavities 36 and 38 that are disposed above the regenerator packings 22 and 24 of the respective regenerators 14 and 16. First primary fuel ports 40 and secondary primary fuel ports 42 are positioned in one or more of the ports 26 and 28, respectively, to provide heat to maintain a pool of molten glass 44.

A reburn fuel port 46, for introducing natural gas or other reburn fuel, is associated with each of the ports 26 and 28. Primary burnout air ports 48, to completely burn the reburn fuel, are located in the first cavities 36 and 38 of each of the respective regenerators 14 and 16.

The second cavities 50 and 52 are respectively located below the beds of refractory packing material 22 and 24 of the primary regenerators 14 and 16. Secondary burnout air ports 54 and 56 are located in the second cavities 50 and 52, respectively, for introducing additional burnout air, along with a selective non-catalytic reducing agent, as taught the '755 patent. Second refractory housings 58 and 60, containing second beds 62 and 64 of refractory packing are located beneath the second cavities 50 and 52. As discussed below, in accordance with one embodiment of the present invention, the second beds of regenerator packing 62 and 64 may each comprise a checker structure of refractory brick (See FIG. 5).

The flow of the furnace flue gas is reversed periodically, such as every ten to twenty minutes. In the mode of operation shown in FIG. 1, the gas flows are from left to right. In this mode, incoming combustion air enters the melting chamber 12 through a stack (not shown) into the (left hand) refractory housing 58 of the left hand regenerator 14 and passes through port 26. Exhaust gases exit from the melting chamber 12 through port 28 and pass through the right hand regenerator 16. Incoming combustion air is preheated by the first and second beds of refractory packing 62 and 22 of the left hand regenerator 14, and fuel (such as oil or natural gas) is mixed with the preheated air by means of burner nozzles 66 provided in the primary fuel port 40 of the left port 26. In this mode, a flame 68, having a reducing portion 69, extends from burner nozzles 66 across the molten glass 44 (from left to right). During this phase of the firing cycle, burner nozzles (not shown) located in the right hand ports 28 remain inactive.

The exhaust gases leave the melting chamber 12 through the right hand ports 28 and pass through the right hand regenerator 16 where the heat from the flue gas stream is transferred to the bed of refractory packing 24. Additional heat recovery is accomplished downstream in the second bed of refractory packing 64 of the regenerator 16.

When the temperature of the refractory packings 24 and 64 approaches its upper limits, the firing of the furnace is reversed. The left primary fuel port 40 (on the left side of the furnace) is turned off, and the right primary fuel port 42 is turned on. In this mode, incoming combustion air is passed through the second, and then the first, beds of refractory packings 64 and 24 of the (right-hand) regenerator 16, and the exhaust gases exit the melting chamber 12 through the first, and then the second, beds of refractory packing 22 and 62 of the (left-hand) regenerator 14. The flow of the furnace flue gas is reversed periodically, such as every ten to twenty minutes. In the reverse mode of operation, the incoming combustion air will be heated as it passes through the respective beds of refractory packing 24 and 60 of the regenerator 16.

2. Optimization of Advanced Gas Reburn

In accordance with the present invention, a number of control process may be used, together or independently, to increase the thermal efficiencies of, and reduce the fuel penalty that is associated with, the use of advanced gas reburn technology, i.e., to obtain "optimized advanced gas reburn." As discussed below, the control processes of the present invention are expected to reduce the fuel penalty that is associated with advanced gas reburn from about 8% to 10% to approximately 2% of the total fuel input (i.e., the total of the reburn fuel and the primary fuel). These control processes are achieved by (1) improved radiative heat transfer (yielding a fuel savings of about 2% to 3%); (2) reduced reburn fuel requirements (yielding a fuel savings of about 4%); and (3) improved regenerator convective heat transfer (yielding a fuel savings of about 2% to 3%).

a. Improved Radiative Heat Transfer

One control process of the present invention involves improving the rate of heat transfer from the primary flame to the melting tank and hence to the glass melt. This in turn lowers the temperatures along the exhaust gas path and reduces the amount of thermal stress on the refractory materials, hence improving thermal efficiency and refractory life. This is achieved in part through the adjustment of the burner nozzles 66 to maintain only a slight excess of air over the stoichiometric proportion, subject to glass quality process constraints (i.e., a critical level of excess air ensures an oxidizing environment over the surface of the glass melt). The small excess of air tends to minimize the production of $NO_X$.

A solid carbonaceous material or a heavy fuel oil, supplied as approximately 5% of the total fuel flow, is then introduced into, and co-fired with the primary fuel, in the reducing part 69 of the gas flame 68 of the burner nozzle 66. The solid carbonaceous or a heavy fuel oil can be introduced to the reducing part 69 of the gas flame 68 through the primary fuel nozzle (in the case of fuel oil) or through a separate nozzle or mechanism proximal to the reducing part of the gas flame 68. This generates a high number density of carbonaceous particles which significantly improves soot radiation, by several orders of magnitude, and hence greatly enhances melter heat absorption.

These two steps therefore serve to improve the radiant heat transfer from the flame 68 of the burner nozzles 66 to the melting tank 12 and the glass melt 44. They also advantageously reduce the temperature of the flue gas at the downstream reburn fuel port 46 (and ultimately the downstream beds of refractory packing 24 and 64 of the regenerators) by approximately 200° F.

b. Reduced Reburn Fuel Requirements

Another control process for optimizing advanced gas reburn in accordance with the present invention involves reducing the amount of reburn fuel that is used. More particularly, this involves operating the primary combustion zone near stoichiometry to reduce reburn fuel consumption (as aforesaid); operating the gas reburn zone at an optimal fuel rate (preferably at about 95% of the stoichiometric proportion of oxygen); obtaining optimized mixing of the reburn fuel early in the first cavity, and at as high a temperature as possible, to allow for maximum burnout rates and residence time; and optimized conditions for the introduction of the SNCR agent (in the second cavity).

Experimental data has suggested an optimization of the advanced gas reburn process involving the following steps:

operate the gas reburn step under conditions sufficient to obtain about 50% to 60% $NO_x$ reduction;

readjust the stoichiometry over the primary regenerator to obtain optimum conditions for downstream SNCR injection;

inject the SNCR agent in the second cavity at or near optimum reaction temperature;

complete the secondary burnout, preferably at a lower temperature.

1) Reburn Fuel Mixing and Burnout

In accordance with a control process of the present invention, a sufficient amount of reburn fuel is introduced at the downstream reburn fuel port (port 46 in the left-to-right mode illustrated in FIG. 1) to move the stoichiometry at that location (at the reburn zone, designated "$SR_2$") to about 95% (of the stoichiometric proportion of oxygen). Experimental sub-scale data has provided a quantitative validation of the potential effect of stoichiometry on $NO_x$ reduction. More particularly, the key parameters affecting reburn system performance were evaluated at pilot scale, over a wide range of operating conditions:

Gas temperature in the reburn zone, 1900 to 2950° F.
Reburn zone residence time, 200 to 650 ms
Reburn zone stoichiometry, 0.8 to 1.05
Inlet $NO_x$, 100 to 3000 ppm The pilot scale tests were conducted at a Controlled Temperature Tower Furnace (CTT). The CTT was a down-fired tunnel furnace with a nominal firing rate of 70,000 Btu/hr. The CTT was equipped with ample ports along its axis to allow insertion of test equipment such as reburn fuel and overfire air injectors, furnace gas sampling probes, and temperature measurement equipment. The CTT also had two natural gas back-fired heating channels that allow manipulation of the facility residence time/temperature profile.

These burners may be fired through channels in the refractory wall countercurrent to main furnace combustion gases. The facility temperature profile can also be adjusted by inserting circulating water cooling coils in ports along the furnace exits.

Figure 2:
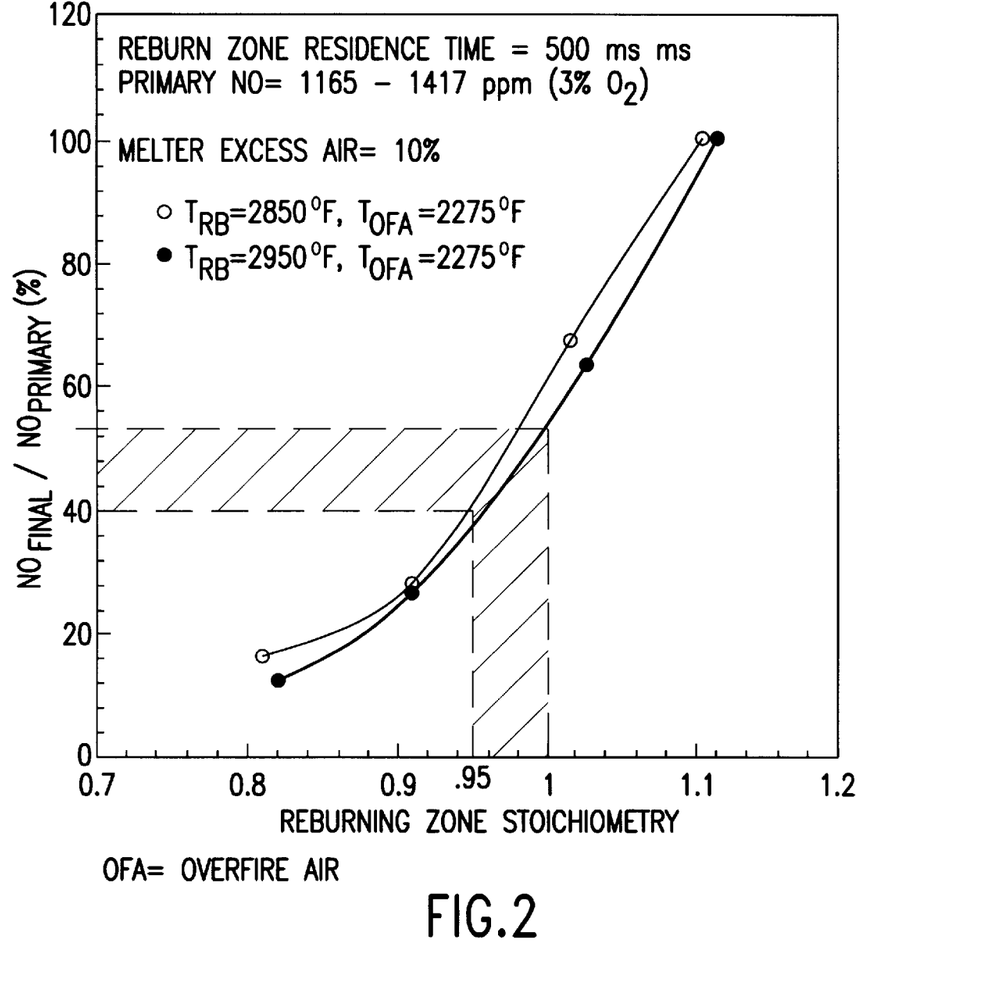
FIG. 2 is a plot showing the potential effect of reburn zone stoichiometry and reburn temperature on $NO_X$ reduction.

FIG. 2 shows experimental results for primary gas reburning under reducing ($SR_2<1$) conditions. More particularly, FIG. 2 shows the ratio of $NO_x$ emissions to initial $NO_x$ as a function of primary reburn zone stoichiometry at several zone temperatures. As is evident from FIG. 2, the reburning zone stoichiometry ("SR") strongly influences the level of $NO_x$ reduction between unit stoichiometry and 0.9. As the stoichiometry is further enriched, the level of $NO_x$ reduction becomes progressively diminished. Thus, significant fuel savings and primary $NO_x$ reduction occurs between SR 2's of 0.92 to 0.95. As discussed below, this also appears to be an efficient stoichiometry range for SNCR (in the case of advanced gas reburning).

Figure 3:
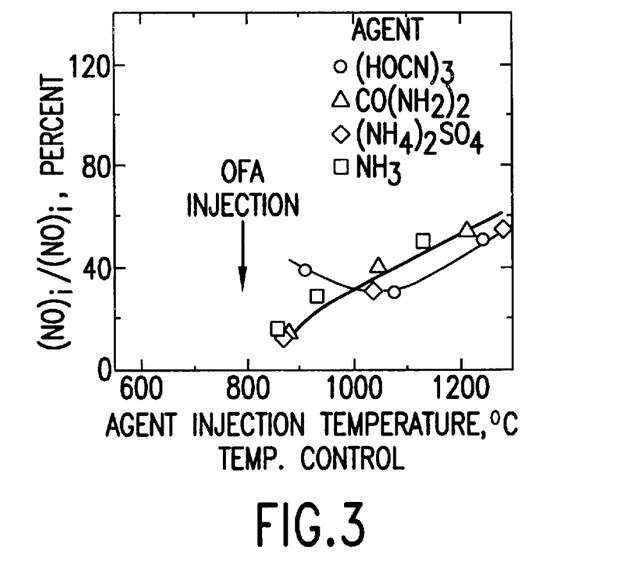
FIG. 3 is a plot showing the effect of the temperature of the selective, non-catalytic reduction ("SNCR") agent injection zone on $NO_X$ reduction.

FIG. 2 and FIG. 3 show experimental results of the effect of reburn zone stoichiometry and temperature on advanced gas reburn agent stoichiometry and efficiency. Advanced gas reburn agents successfully implemented include urea (CO($NH_2)_2$), ammonia ($NH_3$), cyanuric acid (($HOCN)_3$), and ammonium sulfate (($NH_4)_2SO_4$). In each case, $NO_x$ reduction results are shown for advanced gas reburning in which uncombusted fuel fragments are allowed to pass into the agent injection zone, i.e., the second cavity. Reburning zone stoichiometry was adjusted to $SR_3=0.99$ to provide the optimum amount of CO slip into the SNCR zone. The lean zone stoichiometry was $SR_4=1.02$ to burnout the fuel fragments after the SNCR reduction reactions have proceeded to completion. Initial NO concentration was 240 ppm, and XN/NO=1.5. Several agents were tested, with 1.5 moles of additive nitrogen (XN) added for every mole of $NO_x$. As is evident from FIGS. 2 and 3, SNCR reductions of 80% or better are potentially achievable with optimized advanced gas reburning conditions, such as the stoichiometric ratios discussed above.

In accordance with the present invention, the reburn fuel preferably is introduced in the first cavity early and at a high temperature, to allow for maximum burnout rates and time. Because the amount of reburn fuel is only a fraction of the primary fuel, it is desirable to provide a mechanism for enhanced mixing the same with the flue gas stream, such as by sonic or near sonic injection. This may require redesign of existing fuel nozzles, such as to provide concentric primary and sonic reburn fuel nozzles, flue gas blending with the reburn fuel, and/or additional nozzles located higher up on the port side or top wall of the first cavities 36 and 38.

The flue gas from the primary combustion zone maintains a sufficient residence time in the first cavity, about ⅓ of a second, to mix with the reburn fuel and reduce $NO_x$ to molecular nitrogen. Subsequently, burnout air is introduced in the first cavity to adjust the CO and H2 compositions for optimal SNCR control downstream (as disclosed in the '755 patent).

Burnout air may be injected at two different pressures, such as through two concentric nozzles. A higher pressure burnout air nozzle 48 may be pulsed, such as by a Helmholz resonator. This enhances mixing of the burnout air with the flue gas, through expanding and collapsing flow fields, to thereby fill the far flow field flue gas cross-sectional area over the regenerator checkers. This also enhances convective heat transfer by promoting boundary layer instability on the surface of the first bed of refractory packing (e.g., bed of refractory packing 64) (such as is discussed below with respect to the lower bed of refractory packing 60).

The location of burnout air injectors 48 and 49 presents optimization issues. It may be desirable to add some air just before or within the first cavity to provide an initial stoichiometric adjustment for downstream SNCR agent injection.

Figure 4:
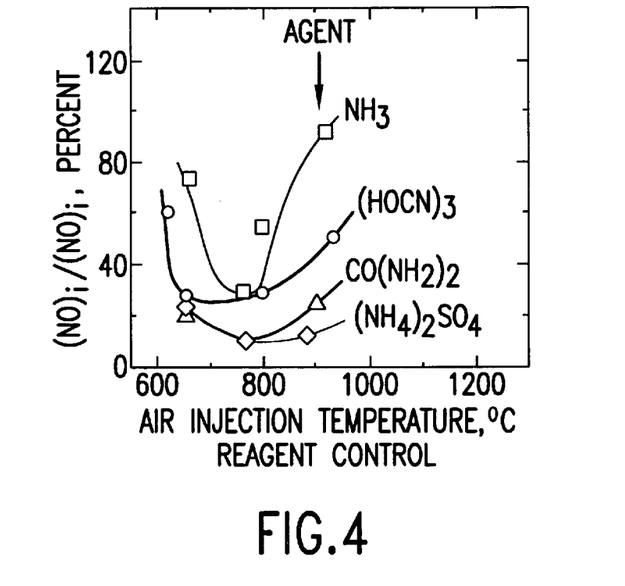
FIG. 4 is a plot showing the effect of the temperature of the burnout air on $NO_X$ reduction.

In accordance with the disclosure of the '755 patent, a SNCR reagent (e.g., NH3) is then introduced into the flue gas through port 56 located in the second cavity 52 (or port 54 of second cavity 50 when the flow of furnace flue gas is in the reversed mode of operation, i.e., from right to left). As shown in FIG. 4, the flue gas, as conditioned by the introduction of burnout air (to adjust CO and $H_2$) (discussed above), now has a more broad temperature window FIG. 4. This is because the unburned CO or $H_2$ participate in chain carrying and branching free radical chemical reactions which persist over a larger temperature range than the primary reduction reactions. This also potentially achieves a SNCR component of $NO_X$ control efficiency of 70% to 80%.

Final burnout air is introduced in the second cavity at a sufficiently high temperature to assure burnout of the CO and HC to regulatory compliance levels (typically less than 100 ppm). If temperature windows are compatible, the SNCR reagent could be vaporized into the final burnout air prior to its introduction into the second cavity. It will thus be understood that the location of the final burnout air ports 54 and 56 must be optimized. In this regard, the final burnout air should be injected above 1400° F. or preferably about 1600° F. (for burnout and maximum $NO_X$ reduction).

2) Improved Convective Heat Exchange

Figure 5:
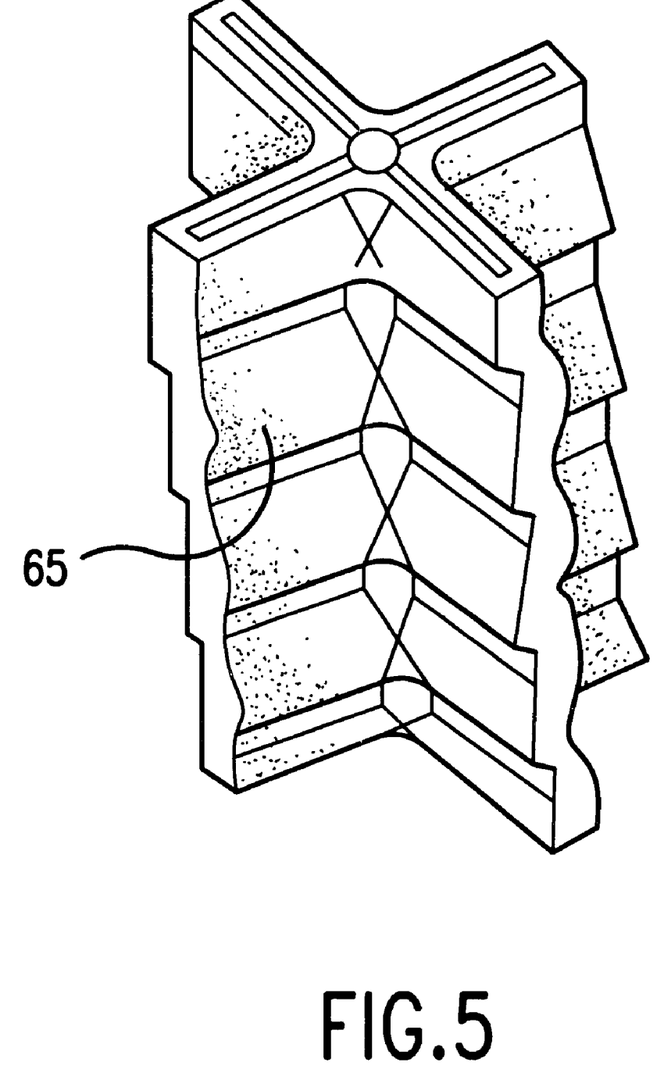
FIG. 5 is an isolated fragmentary perspective view of a stepped surface of refractory packing in accordance with one embodiment of the present invention.

Another control process of the present invention is the design of improved heat transfer packing for use in conjunction with improved mixing methods. As shown in FIG. 5, enhanced heat transfer packing is provided in the second beds of refractory packing 62 and 64 to recover the heat that is released in either of the two burnout air zones. Enhanced heat transfer packing is desirable because heat recovery in the regenerator is inhibited by the viscous effects of gases adjacent the refractory surface. These gases serve to create a "thermal boundary layer" adjacent the refractory surface that is stratified in terms of temperature.

As shown in FIG. 5, enhanced heat transfer is achieved, in part, by the known use of forming "steps" (e.g., step 65) in the checker of refractory packing. The steps, which are formed in the surface of the checker of refractory packing, promote the mixing or "tripping" of the boundary layer gases adjacent the refractory surface of the first (upper) or second (lower) regenerators. More particularly, as the gases move over the surface of the steps formed in the surface of the checker, small scale turbulents are created. These turbulents serve to prevent the formation of temperature stratified layers of gases adjacent the surface of the refractory and thereby increase the heat transfer and thermal storage of the checkers. This increases the thermal efficiency of the respective regenerators.

In accordance with one embodiment of the present invention, one or more of the secondary burnout air ports 54 and 56 is designed to provide pulsed gases into an area of the regenerator structure that is upstream of, or otherwise associated with, the beds of refractory packing 62 and 64, such as by a Helmholz resonator. This makes the thermal boundary layer gases unstable and thereby promotes tripping of the boundary layer gases. Alternatively, an acoustical wave generator, vortex generator, or other suitable mechanism may be used to promote tripping of the boundary layer gases. It will be understood that other, alternative methods of promoting tripping of the boundary layer gases may be used, including any structure that creates a discontinuity of the surface of refractory.

All of the above steps may be implemented through the design of conventional temperature and composition loop controllers. Preferred gas reburn or agent flow set points for zone stoichiometry could be ascertained by furnace characterization tests. Adaptive control or expert system concepts, using furnace heat transfer and kinetic models and advanced gas analyzers, could be utilized as features of the control system. In particular, a multi-point CO2/CO analyzer could be located at each port to provide feed forward/back control of primary and reburn fuels.

3. Cost Effectiveness of optimized Advanced Gas Reburn

Based upon implementation of the above described methods for optimizing advanced gas reburn, and using the experimental sub-scale data of FIGS. 2, 3 and 4, pro-forma performance parameters have been established. These parameters were used to project the economic performance of optimized advanced gas reburn (see Table 1) and were compared with that of competing $NO_X$ reduction technologies (i.e., those capable of achieving 60% to 90% $NO_X$ reduction). The primary comparison was made on the basis of a 500 tpd production rate on a typical float furnace emitting 15 lbs. $NO_2$/ton glass and assumed to have a ten year economic life. The regenerator structures were increased by 10% to accommodate the enhanced beds of refractory packing of the present invention. The turnkey cost of the advanced gas reburn system is estimated at $1.5 million inclusive of engineering, equipment, and construction.

Using the performance parameters and optimization methods disclosed above, it is projected that the fuel penalty associated with advanced gas reburn has been reduced from about 8% to 10% for conventional gas reburn to about 2%. This reflects a fuel savings of about 4% from a reduction in the amount of reburn fuel, a fuel savings of about 2% to 3% from improved radiative heat transfer, and fuel savings of about 2% to 3% from improved convective heat transfer. The results show that the cost-effectiveness ($ per ton $NO_X$ abated) of optimized advanced gas reburn is significantly better than the cost effectiveness of oxy-fuel, by a factor of four. These enhanced heat transfer approaches can obviously be applied in any high temperature furnace absent the use of a gas reburn. However, the reburn injection hardware can be made to serve the dual purposes of agent injection and heat transfer enhancement.

Advanced gas reburn may be the only $NO_X$ reduction technology that is retrofittable without a furnace rebuild. Advanced gas reburn offers a somewhat slight improvement in the cost of $NO_X$ reduction over conventional reburn (562 vs. 569 $/ton $NO_2$ abated), but with significantly better $NO_X$ control (90 vs. 75%).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and scope of the claims are to be embraced within their scope.

I claim:

1. A process for increasing thermal efficiencies for high temperature industrial furnaces and the like comprising the steps of:
   (a) mixing a reburning fuel with combustion emissions in a gaseous reburning zone such that the reburning zone is substantially oxygen deficient;
   (b) passing the resulting mixture of reburning fuel and combustion emissions into a first burnout zone;

(c) introducing burnout air into the first burnout zone such that the carbon monoxide concentration in the first burnout zone is reduced to a level below about 500 ppm;

(d) enhancing the mixing of first burnout air with the flue gas downstream of the primary combustion zone in a first burnout zone;

(e) advancing the resulting mixture from the first burnout zone to a second burnout zone having a temperature in the range from about 1300° F. to about 1900° F.; and (f) introducing a second stream of burnout air into the second burnout zone, said second stream of burnout air including a reducing agent capable of providing a source of nitrogenous reducing species thereby reducing the nitrogen oxides in the combustion emissions.

2. The process of claim 1 wherein the industrial furnace has refractory packing having boundary layer gases proximal to it comprising in addition the step of promoting instability of the boundary layer gases adjacent the refractory packing.

3. The process of claim 2 wherein the promoting step is carried out by a Helmholz resonator.

4. The process of claim 2 wherein the promoting step is carried out by an acoustic wave generator.

5. The process of claim 1 wherein the enhancing step is carried out by a Helmholz resonator.

6. The process of claim 1 wherein the enhancing step is carried out by an acoustic wave generator.

7. The process of claim 1 comprising in addition co-firing a carbonaceous solid or heavy fuel oil with the primary fuel in the flame of the primary combustion zone such that the co-fired fuel is cracked and thereby generates a high number density of carbonaceous particles sufficient to improve soot radiation.

8. A process for increasing thermal efficiencies for high temperature industrial furnaces having a refractory packing comprising the steps of:

(a) mixing a reburning fuel with combustion emissions in a gaseous reburning zone such that the reburning zone is substantially oxygen deficient;

(b) passing the resulting mixture of reburning fuel and combustion emissions into a first burnout zone;

(c) introducing burnout air into the first burnout zone such that the carbon monoxide concentration in the first burnout zone is reduced to a level below about 500 ppm;

(d) advancing the resulting mixture from the first burnout zone to a second burnout zone having a temperature in the range from about 1300° F. to about 1900° F.;

(e) introducing into the second burnout zone a reducing agent capable of providing a source of nitrogenous reducing species thereby reducing the nitrogen oxides in the combustion emissions; and (f) advancing the second stream of burnout air and the combustion emissions to a bed of refractory packing, the bed of refractory packing having a surface adapted to promote the tripping of the boundary layer gases proximal to it.

9. The process of claim 8 wherein the promoting step is carried out by an acoustic wave generator.

10. The process of claim 8 wherein the surface adapted to promote the tripping of the boundary layer gases is carried out by discontinuities formed in the surface of the refractory packing.

* * * * *